(12) United States Patent
Lambiaso

(10) Patent No.: US 6,527,566 B1
(45) Date of Patent: Mar. 4, 2003

(54) SPRING-LOADED MECHANISM TO ACCESS PASSENGER INTERFACE UNITS

(75) Inventor: Guy Lambiaso, Garden Grove, CA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/025,478

(22) Filed: Dec. 19, 2001

(51) Int. Cl.[7] ............................................. H01R 13/60
(52) U.S. Cl. ........................................ 439/131; 439/135
(58) Field of Search ................................. 439/131, 135; 174/57, 53

(56) References Cited

U.S. PATENT DOCUMENTS

| | | | | |
|---|---|---|---|---|
| 5,122,069 A | * | 6/1992 | Brownlie et al. | 439/131 |
| 5,755,582 A | * | 5/1998 | Charlton | 439/131 |
| 5,934,917 A | * | 8/1999 | Haut | 439/131 |
| 6,290,518 B1 | * | 9/2001 | Byrne | 439/131 |
| 6,435,729 B1 | * | 8/2002 | Thevenod et al. | 439/131 |

* cited by examiner

Primary Examiner—Gary Paumen
(74) Attorney, Agent, or Firm—Harness Dickey & Pierce P.L.C.

(57) ABSTRACT

An apparatus is for physically accessing a passenger interface unit (PIU) within a LAN of a mobile platform. The apparatus includes a housing recessed in a floor surface of the mobile platform, and a spring-loaded hinge coupled to the PIU and an upper edge of a sidewall of the housing. The spring-loaded hinge rotates between a non-deployed position and a deployed position. The apparatus also includes a cover plate to cover the housing, the spring-loaded hinge and the PIU when the spring-loaded hinge is in the non-deployed position, thereby making the PIU inaccessible. Additionally, the spring-loaded hinge automatically rotates to the deployed position when the cover plate is removed, thereby deploying said PIU such that the PIU is accessible.

18 Claims, 2 Drawing Sheets

US 6,527,566 B1

SPRING-LOADED MECHANISM TO ACCESS PASSENGER INTERFACE UNITS

FIELD OF INVENTION

The invention relates generally to a telecommunication network, such as a local area network (LAN), on a mobile platform. More specifically, the invention relates to a spring-loaded mechanism that houses a node module of the LAN.

BACKGROUND OF THE INVENTION

Mobile platforms, such as aircraft, trains, and buses, often must be quickly and easily reconfigured to accommodate changing seating requirements, the addition of LAN equipment, such as PIUs, and to accommodate varying combinations of passenger and cargo payloads. The task of seat reconfiguration is made difficult by the presence of a multitude of wires and cables running through the floor and seat tracks to provide audio and video entertainment, telephone services, reading light controls, connection to the LAN for Internet access, and electrical power to the passenger seats.

Typically, when node modules such as a passenger interface units (PIUs) are added to mobile platform LANs, the PIUs are located under a passenger seat, mounted to the support structure that couples the seat to the floor of the mobile platform. The introduction of a PIU on a passenger seat causes a seat modification as well as associated testing and service bulletins accompanying the modification. The associated testing would include such things as re-certification of the seat to account for the additional weight of the PIU. A service bulletin is a document provided by the seat manufacturer that describes the procedure for modifying the seat to include a PIU. Known PIUs mounted on passenger seats are sometimes referred to as a seat telephone box (STB) or a tap repeater.

In addition to causing testing and service bulletins, locating a PIU under the passenger seat reduces the area under the seat commonly used for storing passenger luggage and restricts passenger legroom. Furthermore, known PIUs have only one connection port, such that a PIU must be provided for each passenger desiring to access the LAN. Therefore, modification to a mobile platform to add PIUs typically involves coupling a PIU to each passenger seat so that a single passenger in the seat behind the seat to which the PIU is mounted can access the LAN.

In view of the foregoing, it would be desirable to provide a mechanism for mounting PIUs on a mobile platform that does not require additional seat testing and service bulletins, or restrict the use of the area under the passenger seats, and enables easy physical access to PIUs.

BRIEF SUMMARY OF THE INVENTION

In one preferred embodiment, an apparatus is provided for accessing a node module of a local area network (LAN) on a mobile platform. The apparatus includes a housing, a spring-loaded hinge coupled to the housing and the node module, and a cover plate that covers the housing, the spring-loaded hinge and the node module.

In another embodiment, a method is provided for accessing a node module within a LAN of a mobile platform. The method comprises providing a housing recessed within an aperture in a floor surface of the mobile platform, thereby storing the node module within the housing. The method also includes providing a spring-loaded hinge coupled to the housing and the node module, and deploying the node module utilizing the spring-loaded hinge.

In yet another embodiment, an apparatus is provided for accessing a passenger interface unit (PIU) within a LAN of a mobile platform. The apparatus includes a housing recessed in a floor surface of the mobile platform, and a spring-loaded hinge coupled to the PIU and an upper edge of a sidewall of the housing The spring-loaded hinge rotates between a non-deployed position and a deployed position. The apparatus also includes a cover plate to cover the housing, the spring-loaded hinge and the PIU when the spring-loaded hinge is in the non-deployed position, thereby making the PIU inaccessible. Additionally, the spring-loaded hinge automatically rotates to the deployed position when the cover plate is removed, thereby deploying said PIU such that the PIU is accessible.

BRIEF DESCRIPTION OF THE DRAWINGS

The present invention will become more fully understood from the detailed description and accompanying drawings, wherein.

DETAILED DESCRIPTION OF THE INVENTION

Figure 1:
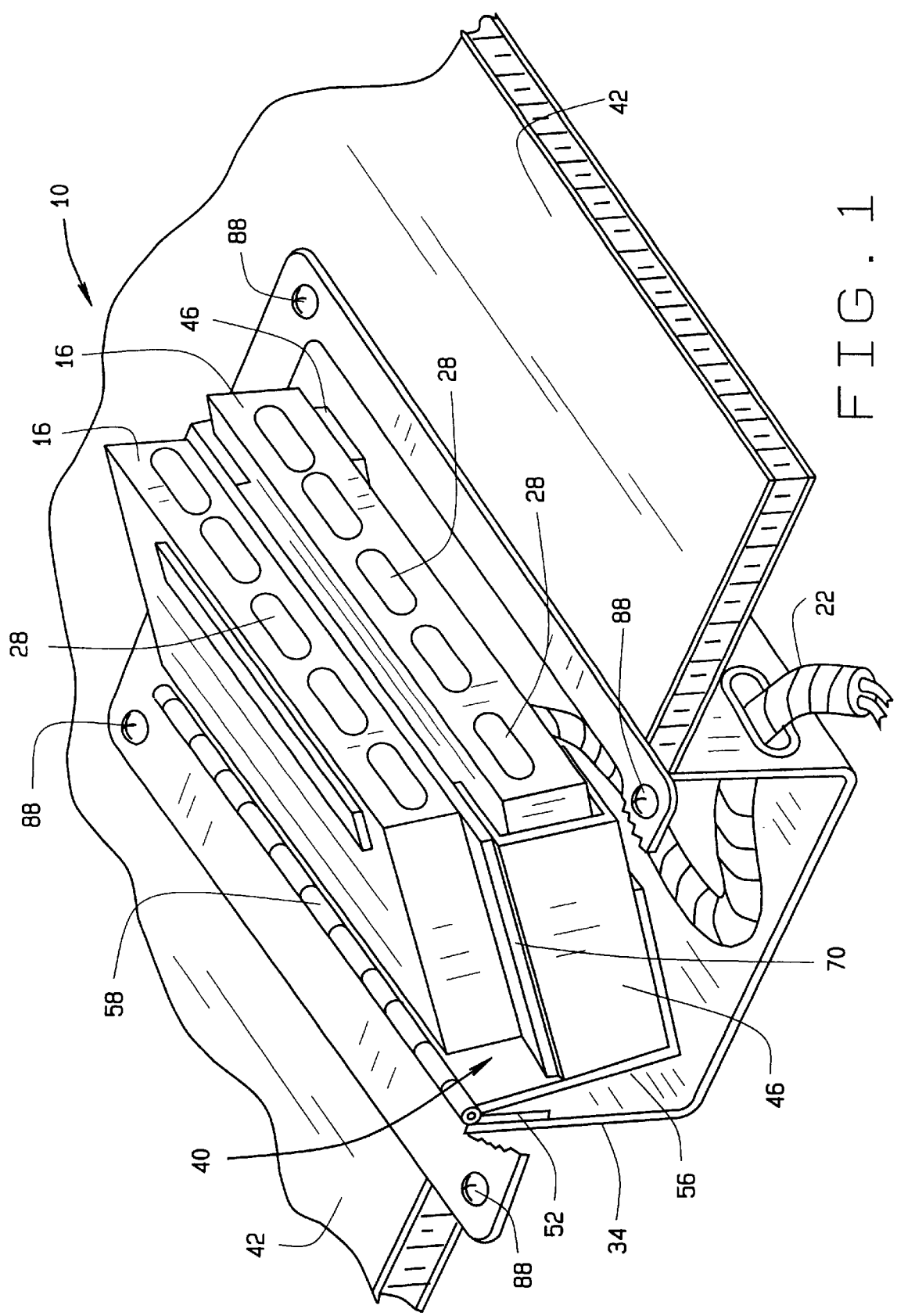
FIG. 1 is a perspective view of an apparatus for providing access to at least one node module of a local area network on a mobile platform, in accordance with a preferred embodiment of the present invention.

FIG. 1 is a perspective view of an apparatus 10 for providing physical access to at least one node module 16 of a local area network (LAN) (not shown) on a mobile platform (not shown), in accordance with a preferred embodiment of the present invention. The mobile platform, as use herein, refers to any mobile vehicle, such as a plane, a train, a bus, or a ship. In the preferred embodiment, node module 16 is a passenger interface unit (PIU). However, it will be appreciated that although node module 16 is described herein as a PIU, node module 16 should not be so limited. The invention is applicable to any LAN node module, for example a router, a switch, a repeater, or any other type of junction within the local area network. The present invention is also applicable to wired networks on the mobile platform other than a LAN, for example an electrical wiring system having node modules, such as junction boxes.

PIU 16 is linked to the backbone of the mobile platform LAN via bundled wires 22, and provides signal distribution and service switching within the LAN. PIU 16 is linked to a LAN sever (not shown) through the backbone and bundled wires 22. Additionally, PIU 16 is linked to a seat interface (not shown) located on, or near, each passenger seat on the mobile platform. Therefore, PIU 16 links at least one seat interface to the LAN server. In the preferred embodiment, one seat interface is provided for each seat on the mobile platform. Each seat interface is a connection, or port, such as an RJ-45 port, to which a user links a personal computing device (PCD), such as a laptop, or a personal data assistant (PDA), thereby gaining access to the LAN server. In this context a user is defined as a passenger, a crew member, or a non-human entity such as an unattended data device. Each seat interface is linked to PIU 16 by lightweight cabling (not shown) that connects to PIU 16 at a PIU port 28. PIU 16 includes a plurality of PIU ports 28. It is envisioned that a plurality of seat interfaces will be serviced by one PIU port 28. For example, each seat interface of one seat group, i.e. a row of seats, will be linked to one PIU port 28. Therefore, if a seat group consisted of three seats, each of the three seat interfaces would be linked to, and serviced by, one PIU port 28.

Apparatus 10 includes a housing 34 and a spring-loaded hinge 40 connected to a top edge of a sidewall of housing 34. Housing 34 is installed into a floor surface 42 of the mobile platform. Ideally, housing 34 includes four sidewalls flanged at the top edge, and a bottom. However, housing 34 could have any form suitable for accommodating PIU 16. FIG. 1 shows housing 34 having one sidewall "cut out" so that spring-loaded hinge 40, one of a pair of C-channels 46, and PIU 16 can be clearly shown. Spring-loaded hinge 40 includes a first leg 52 hingedly connected to a second leg 56 at a spring-loaded hinged joint 58. In the preferred embodiment, first leg 52 is connected to the top edge of a sidewall of housing 34, and C-channels 46 are coupled to second leg 56 at opposing ends of second leg 56. PIU 16 is coupled to spring-loaded hinge 40 by slideably inserting PIU 16 between the pair of opposing C-channels 46. Although PIU 16 has been described herein to be connected to second leg 56 using C-channels 46, it will be appreciated that PIU 16 can be connected to second leg 56 by any suitable fastening means. For example, PIU 16 could be directly coupled to second leg 56 using of clamps, screws, rivets, tape, glue, or Velcro®.

In an alternate embodiment, housing 34 accommodates a second PIU 16 mounted on top of the first PIU 16, as shown in FIG. 1. In the preferred embodiment, the second PIU 16 is coupled to a mounting plate 70 affixed to C-channels 46 such that mounting plate 70 provides a surface for mounting the second PIU 16 on top of the first PIU 16. However, the second PIU 16 could be mounted on top of the first PIU 16 in any suitable fashion. When housing 34 accommodates two PIUs 16, twice as many seat groups can be served by one apparatus 10, thereby reducing the number of apparatus 10 that need to be installed to provide LAN access to all the seats on the mobile platform.

Figure 2:
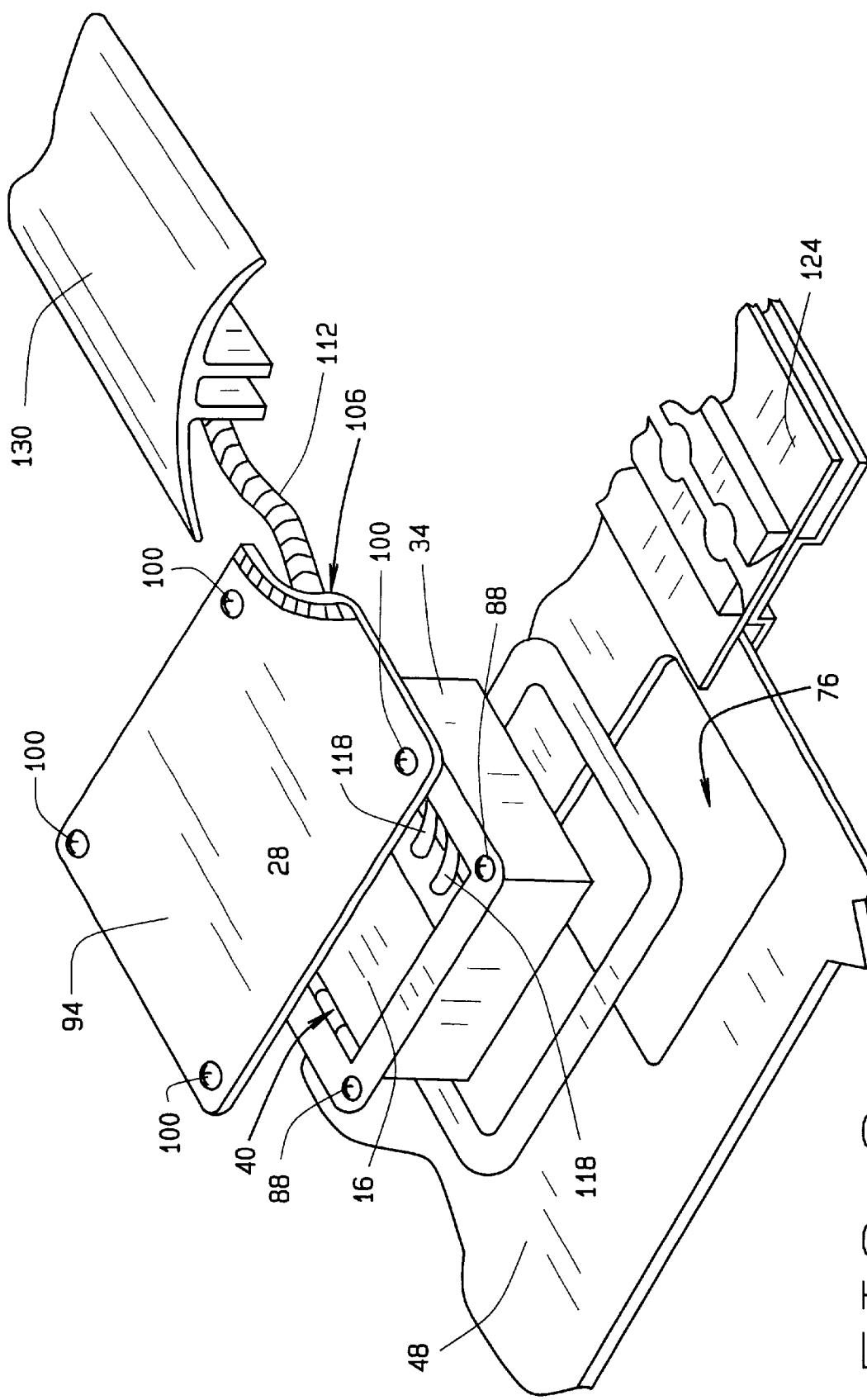
FIG. 2 is a perspective view showing how the apparatus shown in FIG. 1 is installed in a flooring surface of the mobile platform.

FIG. 2 is a perspective view showing how apparatus 10 (shown in FIG. 1) is installed in flooring surface 42 of the mobile platform. Housing 34 fits within an aperture 76 in floor surface 42 such that the housing sidewalls and bottom are recessed in floor surface 42. A closed cell foam gasket 82 is placed around housing 34 such that gasket 82 fits between the flanged top edge of the housing 34 sidewalls and the flooring surface 42. Closed cell foam gasket 82 provides a seal around housing 34 to prevent moisture, liquids, dirt, and other contaminates from penetrating floor surface 42 at aperture 76. Housing 34 is affixed to floor surface 42 using connectors 88, which are any suitable connecting means such as screws, rivets, or snaps. Once housing 34, including PIU 16 connected to housing 34 via spring-loaded hinge 40, is installed in floor surface 48, a cover plate 94 is placed over housing 34 and connected to floor surface 48 using connectors 100. Connectors 100 are any suitable connecting means such as screws, rivets, or snaps.

Cover plate 94 covers housing 34, spring-loaded hinge 40, and PIU 16, and has a small egress 106 cut out of one edge. Egress 106 allows a trunk line 112 to exit housing 34. As described above, each seat interface is linked to PIU 16 by lightweight cabling that connects to PIU 16 at one of a plurality of ports 28 (shown in FIG. 1), and each PIU port 28 preferably services a plurality of seat interfaces. FIG. 2 shows bundled cables 118 connected to PIU 16 at ports 28. Each bundled cable 118 includes at least one lightweight cable linking a seat interface to PIU 16. In the case where a PIU port 28 services a plurality of seat interfaces, bundled cable 118 includes a plurality of lightweight cables connected to PIU 16 at one PIU port 28. Thus, in the preferred embodiment, each bundled cable 118 includes a plurality of lightweight cables linking a plurality of seat interfaces to a single PIU port 28, and trunk line 112 includes a plurality of bundled cables 118.

In the preferred embodiment, housing 16 is located near a seat track 124 so that trunk line 112 exits housing 16 through egress 106 under a seat track cover 130. Seat track cover 130 protects trunk line 112 from exposure to a harsh environment where trunk line 112 could be tampered with, stepped on, or kicked by a passenger. Trunk line 112 extends along seat track 124 and at each seat group, i.e. a row of seats, one of the bundled cables 118 exits trunk line 112 and connects to at least one seat interface. Therefore, if trunk line 112 includes eight bundled cables 118, trunk line 112 would extend along seat track 124 to eight seat groups. It will be appreciated that trunk line 112 could include greater than, or fewer than, eight bundled cables 118, not to exceed a number of bundled cables equal to the number of PIU ports 28. In one embodiment, trunk line 112 exits housing 16 and extends in one direction, either fore or aft, along seat track 124 to the number of seat groups equal to the number of bundled cables 118 included in trunk line 112. In an alternate embodiment, trunk line 112 exits housing 16 and splits into two sub-trunk lines, one sub-trunk line extending fore to a number of seat groups equal to half the number of bundled cables 118 in trunk line 112, and the other sub-trunk line extending aft, for the number of seat groups equal to number of bundled cables 118 remaining in trunk line 112.

A seat interface is located on, or near, each seat on the mobile platform. A passenger desiring to access the LAN links a PCD to a seat interface located on, or near, the seat in front of the passenger, using a suitable connector such as an RJ-45 communications cable, a bi-directional infrared signal, or radio frequency signals. The seat interface located on each seat is a lightweight port or connector, such as a RJ-45 connector, linked to PIU 16 by the lightweight cable. It will be appreciated that a single seat interface may be located on each seat, for example in the back of each seat, or that a plurality of seat interfaces may be grouped together and located at one location on a seat group, for example on the back of an armrest between two seats. Locating PIU 16 in floor surface 48 and mounting the lightweight seat interface and cable on the passenger seat requires only a minor seat modification and has only a minor impact to the seat certification.

Alternatively, the seat interfaces are located near a seat group, for example in floor surface 48 near one leg of each seat. This eliminates any modification to the passenger seat and requires no new seat certification.

In most mobile platforms, particularly wide body aircraft, the LAN cabling to PIU 16 needs to be deployed to the center of the mobile platform through a junction box. By mounting PIU 16 in floor surface 48, PIU 16 can act as a junction box as well as a node module providing signal distribution and service switching within the LAN.

When cover plate 94 is connected to floor surface 42, spring-loaded hinge 40 is in a non-deployed position, and PIU 16 is stored within housing 34 such that PIU 16 is physically inaccessible. When cover plate 94 is removed, spring-loaded hinge 40 automatically rotates from the non-deployed position to a deployed position, wherein PIU 16 is deployed. When PIU 16 is deployed it is physically accessible to a mechanic, or service person. Thus, apparatus 10 enables ease of installation of PIU 16 and provides easy access to PIU 16 for maintenance or removal after PIU 16 has been installed.

In the preferred embodiment, spring-loaded hinge 40 is independent of cover plate 94. Additionally, protection from abrasion of PIU 16 and cover plate 94, caused by the pressure of PIU 16 against cover plate 94 due to the torque loading of spring-loaded hinge 40, is provided by a rubber bumper 134 (shown in FIG. 1). Rubber bumper 134 can be applied to either the back side of cover plate 94 or to the upper side of PIU 16.

If at a future time, the mobile platform is reconfigured such that all apparatus 10 are removed, each aperture 76, created for installation of apparatus 10, can be repaired by installing a plate similar to cover plate 94 over apertures 76. Alternatively, cover plate 94 can be reinstalled to cover aperture 76 after housing 34 is removed.

Locating housing 34 in floor surface 42 minimizes or eliminates the known problems of seat modification associated with locating the PIUs on the passenger seats. Thus, instead of major modifications to a plurality of seat groups and service bulletins, floor surface 42 of the mobile platform is modified and the seats are either not modified or minimally modified such that modifications to service bulletins, re-certification, and/or additional testing is not required. Additionally, spring-loaded hinge 40 makes it possible to install multiple PIUs 16 in a given housing 34, and provides easy physical access to PIUs 16 for installation, maintenance or removal by service personnel.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. An apparatus for providing access to at least one node module of a local area network (LAN) on a mobile platform, the apparatus comprising:
    a housing;
    a spring-loaded hinge coupled to said housing and said node module; and
    a cover plate configured to cover said housing, said spring-loaded hinge and said node module.

2. The apparatus of claim 1, wherein said housing comprises four side walls and a bottom, said housing configured to be mounted within an aperture in a floor surface of the mobile platform such that the housing side walls and bottom are recessed in the floor surface.

3. The apparatus of claim 1, wherein said spring-loaded hinge is configured to be coupled to an upper edge of one said housing sidewalls.

4. The apparatus of claim 1, wherein said spring-loaded hinge is configured to rotate between a non-deployed position and a deployed position.

5. The apparatus of claim 4, wherein said apparatus is configured to store said node module within said housing when said spring-loaded hinge is in the non-deployed position, such that said node module is inaccessible.

6. The apparatus of claim 4, wherein said apparatus is configured to deploy said node module when said spring-loaded hinge is in the deployed position, such that said node module is accessible.

7. The apparatus of claim 4, wherein said cover plate is configured to cover said housing, said spring-loaded hinge and said node module when said spring-loaded hinge is in said non-deployed position.

8. The apparatus of claim 7, wherein said spring-loaded hinge is configured to automatically rotate from the non-deployed position to the deployed position when said cover plate is removed.

9. The apparatus of claim 1, wherein said node module comprises a passenger interface unit (PIU).

10. A method for accessing at least one node module within a local area network (LAN) of a mobile platform, the method comprising:
    providing a housing recessed within an aperture in a floor surface of the mobile platform, wherein the node module is stored within the housing;
    providing a spring-loaded hinge coupled to the housing and the node module; and
    deploying the node module utilizing the spring-loaded hinge.

11. The method of claim 10, wherein providing a housing comprises:
    providing a housing including four sidewalls and a bottom, and
    mounting the housing within an aperture in a floor surface of the mobile platform such that the housing sidewalls and bottom are recessed in the floor surface.

12. The method of claim 10, wherein providing a spring-loaded hinge comprises coupling the spring-loaded hinge to an upper edge of one of the housing sidewalls.

13. The method of claim 10, wherein deploying the node module comprises enabling the spring-loaded hinge to rotate between a non-deployed position and a deployed position.

14. The method of claim 13, wherein deploying the node module further comprises storing the node module within said housing when the spring-loaded hinge is in the non-deployed position, such the node module is inaccessible.

15. The method of claim 13, wherein deploying the node module further comprises deploying the node module when the spring-loaded module is in the deployed position, such that the node module is accessible.

16. The method of claim 10 further comprising:
    providing a cover plate for covering the housing, the spring-loaded hinge and the node module when the spring-loaded hinge is in the non-deployed position; and
    utilizing the spring-loaded hinge to automatically deploy the node module when the cover plate is removed.

17. An apparatus for providing access to a passenger interface unit (PIU) within a local area network (LAN) of a mobile platform, the apparatus comprising:
    a housing configured to be mounted within an aperture in a floor surface of the mobile platform such that said housing is recessed in the floor surface;
    a spring-loaded hinge coupled to said PIU and an upper edge of a sidewall of said housing, said spring-loaded hinge configured to rotate between a non-deployed position and a deployed position; and
    a cover plate configured to cover said housing, said spring-loaded hinge and said PIU when said spring-loaded hinge is in the non-deployed position, such that said PIU is inaccessible.

18. The apparatus of claim 17, wherein said spring-loaded hinge is further configured to automatically rotate from the non-deployed position to the deployed position when said cover plate is removed, thereby deploying said PIU such that said PIU is accessible.

* * * * *